United States Patent
Krishnan et al.

(10) Patent No.: US 7,175,072 B2
(45) Date of Patent: Feb. 13, 2007

(54) STRATEGIES FOR HANDLING TRANSACTIONS BASED ON POLICIES

(75) Inventors: Murali R. Krishnan, Redmond, WA (US); Neelamadhaba Mahapatro, Redmond, WA (US); Wei-Qiang Guo, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/090,322

(22) Filed: Mar. 25, 2005

(65) Prior Publication Data

US 2006/0213975 A1   Sep. 28, 2006

(51) Int. Cl.
*G06F 17/00*   (2006.01)
*G06Q 30/00*   (2006.01)
(52) U.S. Cl. ........................... 235/375; 705/14
(58) Field of Classification Search ............. 235/375; 705/1, 14
See application file for complete search history.

(56) References Cited

U.S. PATENT DOCUMENTS

| | | | |
|---|---|---|---|
| 6,178,408 B1 * | 1/2001 | Copple et al. ............... | 705/14 |
| 6,236,978 B1 * | 5/2001 | Tuzhilin ....................... | 705/26 |
| 6,327,573 B1 * | 12/2001 | Walker et al. ................ | 705/14 |
| 6,792,399 B1 * | 9/2004 | Phillips et al. ............ | 705/36 R |
| 6,959,287 B2 * | 10/2005 | Rabideau et al. ............ | 705/30 |
| 6,965,868 B1 * | 11/2005 | Bednarek ....................... | 705/9 |

* cited by examiner

*Primary Examiner*—Michael G. Lee
*Assistant Examiner*—Jamara A. Franklin
(74) *Attorney, Agent, or Firm*—Lee & Hayes, PLLC

(57) ABSTRACT

A transaction handling system and associated method are described for handling transactions based on a plurality of rule sets that apply to point sets (where the point sets contain points that can be consumed for goods and services, or have some other end-use connotation). Namely, the rule sets can be associated with respective point lots to define the characteristics and behavior of the respective point lots. For example, one rule in an applied rule set can determine whether a consumer is permitted to make a purchase without having sufficient points in the consumer's point lot, thus incurring a negative balance in the point lot. Another rule (e.g., a sandbox rule) can determine whether the consumer is permitted to use points only within a limited identified environment, or whether the consumer can use the points in any environment. An override rule set can override a default rule set on an individual account basis or on an individual consumer basis. Upon a transaction that affects a point lot, the transaction handling system can log the transaction in a record that is associated with the point lot.

20 Claims, 8 Drawing Sheets

STRATEGIES FOR HANDLING TRANSACTIONS BASED ON POLICIES

TECHNICAL FIELD

This subject matter relates to strategies for handling transactions. In a more specific exemplary implementation, this subject matter relates to strategies for handling financial transactions involving the crediting and debiting of allocated funds.

BACKGROUND

Networked computer systems, and particularly the Internet, have revolutionized the handling of financial transactions over the past few decades. For example, a consumer can purchase goods and services on an on-demand basis via websites hosted by providers of such goods and services. The consumer can also automatically make periodic bill payments and transfer funds between accounts via online mechanisms. The consumer can also purchase and play games via online mechanisms. There are many more such applications, and the number of such applications continues to grow at a fast pace.

However, the development of online transaction handling mechanisms has also introduced complexity. As an illustration of this point, consider FIG. 1. FIG. 1 shows an online environment 100 that accommodates a plurality of transaction handling systems (A, B, . . . n). Transaction handling system A includes processing functionality 102 coupled to a data store 104. Transaction handling system B includes processing functionality 106 coupled to a data store 108. Transaction handling system n includes processing functionality 110 coupled to a data store 112. One of many consumers (consumer A) can interact with any of the transaction handling systems (A, B, . . . n) through a device A 114 via an online coupling mechanism (not shown).

Each of the transaction handling systems (A, B, . . . n) is separate from the others. Namely, each of the transaction handling systems (A, B, . . . n) can use different infrastructure, and each of the transaction handling systems (A, B, . . . n) can apply different rules and protocols which govern the handling of transactions. For example, transaction handling system A can permit a consumer to make purchases in excess of an amount of available funds in the consumer's account (thus incurring a debt), while transaction handling system B can prohibit a consumer from incurring a debt. These different systems may therefore provide distinct functionality and rules for handling these two different scenarios. This is merely an example of the many types of transaction handling systems in use today that are designed to serve specific roles. Other systems provide distinct functionality and methodology that is specifically tailored for particular use environments (e.g., a gaming environment, a media download environment, etc.). Other systems provide distinct functionality and methodology that apply to different jurisdictions (e.g., countries), and so forth.

This approach introduces various complexities and inefficiencies. For example, the provider of such systems (A, B, . . . n) might find that these systems do not scale well. That is, because these systems (A, B, . . . n) were developed to serve specific needs, it is difficult to modify these systems to serve other needs. It is true that one special-purpose system can enter into a contractual agreement with another special-purpose system to provide a combined aggregate service. But this implementation is also inefficient and does not scale well, and may be prohibitive from an economical standpoint (because a partner system may charge fees for its services on a per-transaction basis that become prohibitively expensive). Further, the use of independent systems is inefficient because it requires a brute force duplication of processing functionality.

From the user experience standpoint, a consumer is tasked with the responsibility of gaining familiarity with many different systems (A, B, . . . n). This may pose difficulties, as each of these systems (A, B, . . . n) may provide different kinds of interfaces that use different protocols, styles, and so forth.

Another difficultly arises when it is necessary to transfer finds-related resources from one system to another. Since each system uses different infrastructure and methodologies, such conversions may represent a complex task, which may be time-consuming and subject to error.

For at least the above-identified reasons, there is an exemplary need for more satisfactory strategies for handling transactions.

SUMMARY

According to one exemplary implementation, a method is described for handling transactions, comprising: establishing at least one rule set that specifies at least one aspect of a transaction handling methodology; establishing at least one point lot comprising at least one point; applying the above-mentioned at least one rule set to the above-mentioned at least one point lot; and handling a transaction involving the above-mentioned at least one point lot in a manner specified by the above-mentioned at least one rule set.

Additional exemplary implementations are described in the following.

Figure 1:
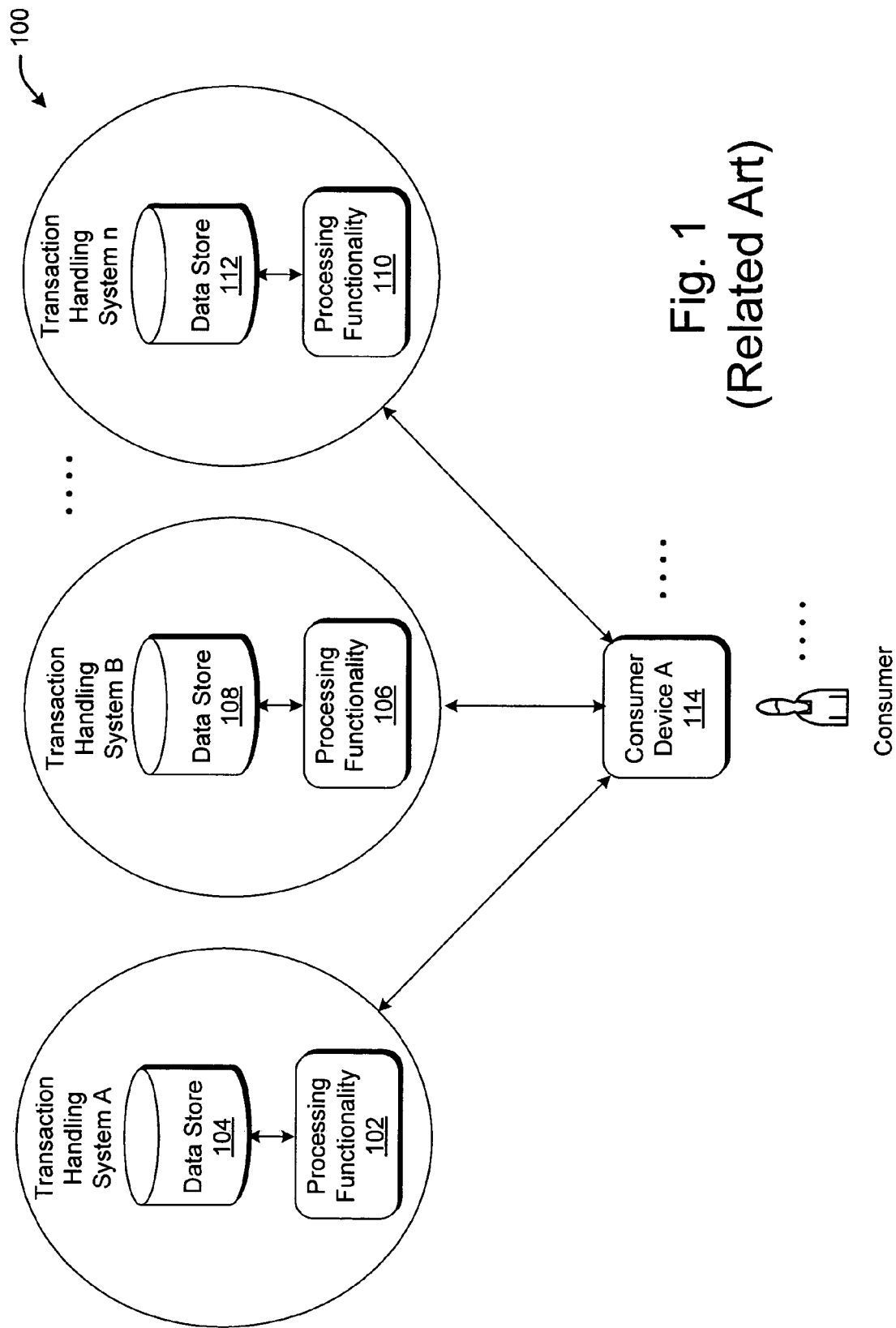
FIG. 1 shows a conventional online environment that comprises a plurality of separate and distinct transaction handling systems.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

The following description sets forth strategies for handling transactions using an integrated transaction handling system. The transaction handling system includes functionality and an associated data store for handling transactions according to different rule sets. To perform this task, the transaction handling system stores a plurality of rule sets that define different transaction handling methodologies. When resources (such as monetary funds) are allocated to a consumer's account, the transaction handling system associates a rule set with the resources. Namely, the rule set determines the manner in which the resources are converted into points to create a so-called point lot. The assigned rule set then governs any subsequent transactions which affect the point lot. For example, the rule set can govern whether a transaction that will decrease the number of points to a negative number (thus incurring a debt) is permitted or not. The assigned rule set can also determine whether the point lot can only be used for transactions in a specific (sand-boxed) use environment, or whether the point lot can be used in any environment. Default rule sets can be overridden by an override rule set associated with an account or a consumer. Upon the completion of a successful transaction, the transaction handling system stores the transaction in a record that is associated with the point lot.

The transaction handling system is described herein principally in the context of finance-related and market-related environments, where the points ultimately correspond to monetary amounts. But the transaction handling system can also be applied to other environments, where the points may not correspond to monetary amounts. For example, the transaction handling system can be applied to a game environment that sponsors different online games, where the points correspond to scores obtained by consumers in playing different games, and so forth.

The strategies described herein confer a number of benefits. According to one benefit, the use of the integrated transaction handling system provides a generic mechanism for handling different transaction handling methodologies. This approach is advantageous because it makes efficient use of system resources. This approach also provides an efficient and effective mechanism for implementing new transaction handling methodologies (e.g., without having to re-engineer the system as a whole or make other substantial changes to the system infrastructure or schemas).

According to another benefit, the use of the integrated transaction handling system also provides an economically feasible mechanism for handling small transactions (without requiring prohibitive cross-system interactions).

According to another benefit, the use of the integrated transaction handling system also provides a uniform interface in which consumers and partners can interact with the system (that is, without requiring the consumers and providers to learn how to interact with many different types of systems).

According to another benefit, the use of the integrated transaction handling system provides a convenient means for converting any given point lot from one applicable rule set to another rule set. The ease in implementing this conversion is due, in part, to the fact that both rule sets are supported by the same underlying transaction system with established rules for performing this transfer (as opposed to exporting an account from one distinct system to another).

Additional features and attendant benefits of the strategies will be set forth in this description.

As to terminology, the term "points" refers to any representation of a part of a resource. The resource typically corresponds to a monetary amount in the legal currency of some jurisdiction (e.g., country). But the resource can also refer to any kind of non-monetary assets.

The term "point lot" refers to a grouping of one or more points.

The term "consumer" refers to anyone who consumes goods and services, or other resources. For example, a consumer may represent a user who purchases goods or services from a website sponsored by a provider of such goods and services. An amount of points can be debited from the consumer's point lot to pay for the purchased goods or services.

The term "provider" refers to any entity that provides a service through which consumers can purchase goods and services. In this context, a provider corresponds to a merchant entity. Or the provider may provide other resources of value to the consumer (which may be conferred on some non-monetary basis).

This disclosure includes the following sections. Section A presents an exemplary unified system for handling transactions. Section B presents a flowchart which describes the operation of the system of Section A. Section C describes an exemplary computer environment for implementing aspects of the system of Section A.

A. Exemplary System (FIGS. 2–4)

Generally, any of the functions described with reference to the figures can be implemented using software, hardware (e.g., fixed logic circuitry), manual processing, or a combination of these implementations. The term "logic, "module" or "functionality" as used herein generally represents software, hardware, or a combination of software and hardware. For instance, in the case of a software implementation, the term "logic," "module," or "functionality" represents program code (and/or declarative content, e.g., markup language content) that performs specified tasks when executed on a processing device or devices (e.g., CPU or CPUs). The program code can be stored in one or more computer readable memory devices. More generally, the illustrated separation of logic, modules and functionality into distinct units may reflect an actual physical grouping and allocation of such software and/or hardware, or can correspond to a conceptual allocation of different tasks performed by a single software program and/or hardware unit. The illustrated logic, modules and functionality can be located at a single site (e.g., as implemented by a processing device), or can be distributed over plural locations.

A.1. Overview of Exemplary Transaction Handling System

Figure 2:
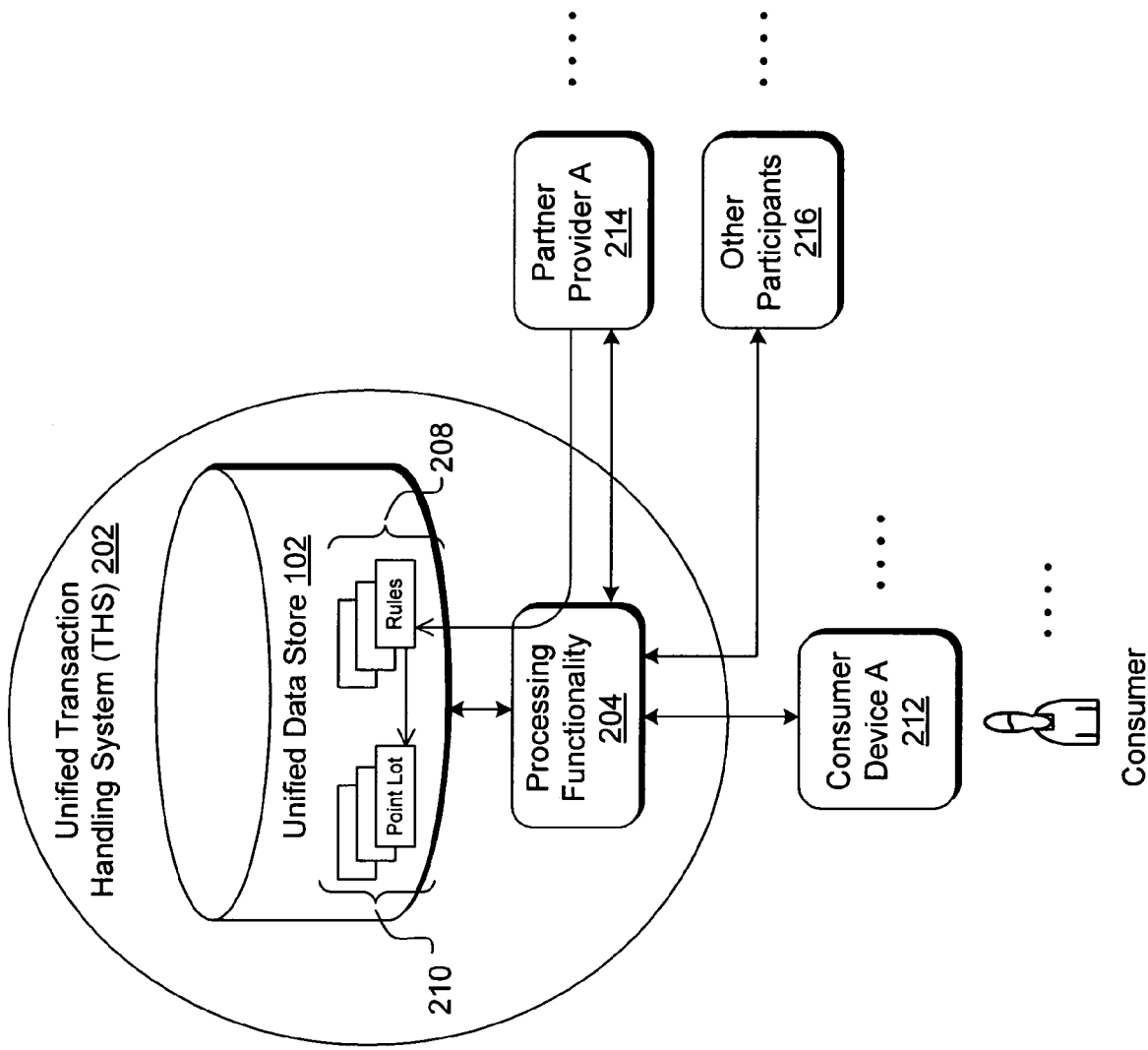
FIG. 2 shows a unified transaction handling system according to the present environment.
Figure 3:
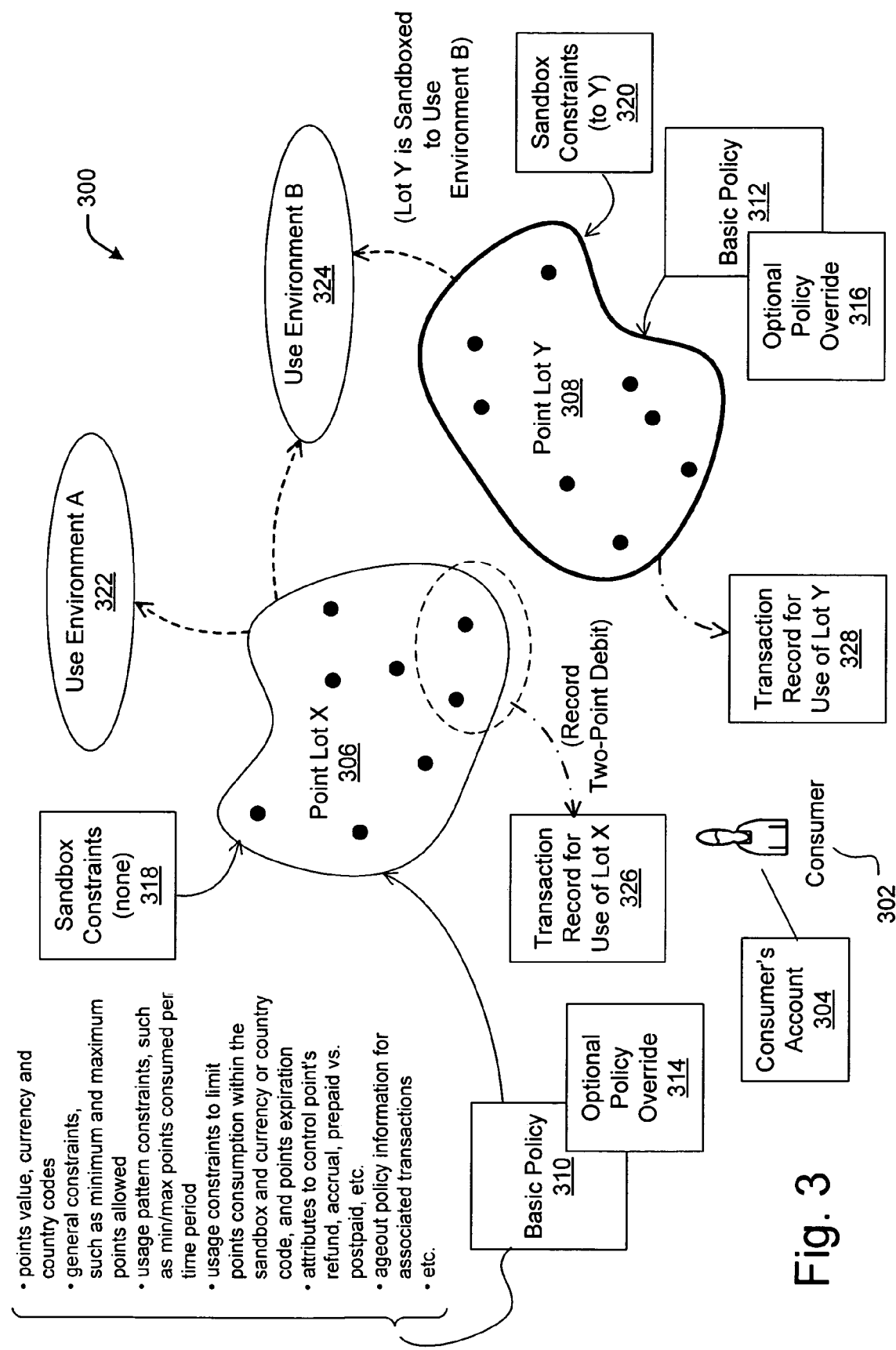
FIG. 3 shows a scenario which illustrates a manner of operation of the transaction handling system of FIG. 2.
Figure 4:
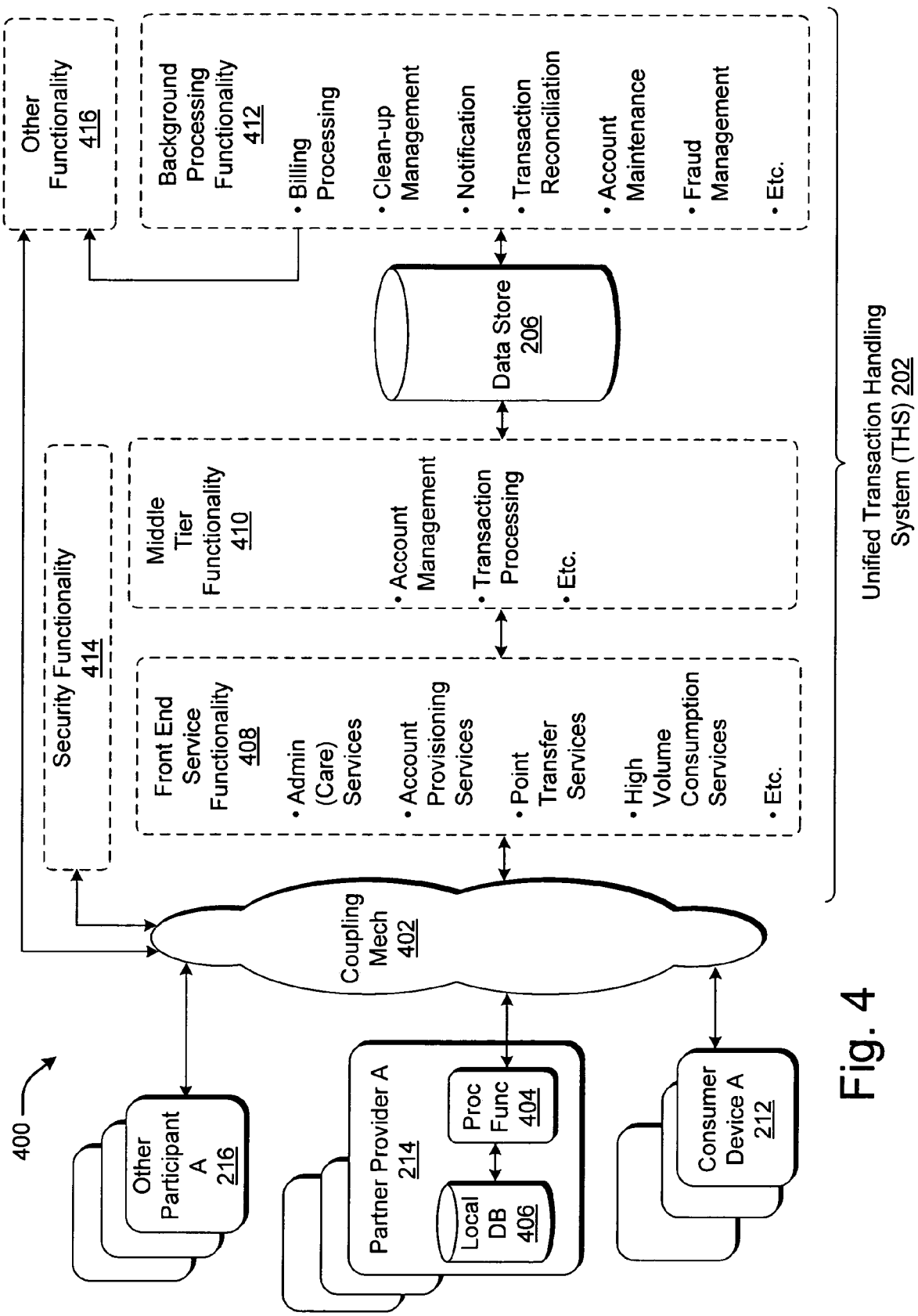
FIG. 4 shows a more detailed depiction of the transaction handling system of FIG. 2.

FIGS. 2 and 3 provide an overview of an exemplary design paradigm for handling transactions using an integrated transaction handling system 202. Later sections provide additional details regarding the transaction handling system 202.

The transaction handling system (THS) 202 includes processing functionality 204 and an associated data store 202 for handling transactions according to multiple different types of transaction handling methodologies. That is, instead of providing plural distinct systems to implement different handling methodologies (as in the technique shown in FIG. 1), the unified THS 202 provides a uniform infrastructure for handling all of the methodologies.

The THS 202 achieves the above-described result by developing a plurality of rule sets 208. The rule sets 208 describe different transaction processing methodologies. The THS 202 then applies the rule sets 208 to the creation of different point lots 210. A point lot refers to a collection of points associated with an owner. For example, a consumer can initiate the creation of a point lot by allocating a prescribed amount of money to pay for goods and services (using the THS 202 or an associated system that works in conjunction with the THS 202). The THS 202 (or the associated system) then converts the monetary amount into a prescribed amount of points.

These points are thereafter used by the consumer as proxies for currency to make purchases. The rule sets 208 are applied to (or associated with) respective point lots 210 in the sense that the rules specified therein define the characteristics and behavior of the point lots 210. In this manner, the rule sets 208 effectively configure the THS 210 to operate on different point lots 210 in different ways, to provide different transaction handling behavior within the framework of a single system, achieving the exemplary benefits enumerated above.

Different participants can interact with the THS 202. For example, a number of consumers can interact with the THS 202 to receive goods and services (and any other asset or benefit) from providers on a points-related basis. FIG. 2 shows an exemplary consumer (A) who interacts with the THS 202 via a consumer device A 212. A number of partner providers can also interact with the THS 202 to provide goods and services (and any other asset or benefit) to the consumers. In one case, a partner may correspond to a merchant that offers consumers goods and services through an appropriately configured website that is accessible to the consumers. FIG. 2 shows an exemplary partner system 214 that interacts with the THS 202. A number of other participants can also interact with the THS 202 depending on the unique characteristics of a specific environment, including various administrative entities that provide assistance to the consumers and/or providers, and so forth. FIG. 2 shows an exemplary "other participant" 216 who can interact with the THS 202 through suitably configured functionality.

FIG. 3 provides an exemplary scenario that illustrates the operation of the THS 202 in greater detail. In this scenario, assume that a consumer 302 owns an account 304. The THS system can identify the consumer 302 by a unique user ID associated with the consumer 302. The THS system can identify the account 304 by a unique account ID associated with the account 304.

Further assume that the account 304 identifies two point lots associated with the consumer 302: point lot X 306 and point lot Y 308. For example, the consumer 302 may have allocated funds in advance to establish these two point lots (306, 308). This scenario is, of course, exemplary and illustrative; the consumer 302 can have any number of accounts. Further, any of these accounts can have any number of point lots associated therewith. The THS 202 can identify the points lots (306, 308) via respective lot IDs associated therewith.

Different rule sets govern the characteristics and behavior of the two different point lots (306, 308). As used herein, the term "rule set" pertains to any information that has an impact on activity associated with the point lots (306, 308), including its creation and subsequent use. In one exemplary implementation, a rule set may include at least policy information and sandbox information. Policy information determines various features of the characteristics and behavior of the point lots, while sandbox information determines the end-use environment(s) to which the point lots can be applied.

In the illustrative case of FIG. 3, a basic policy 310 governs the characteristics and behavior of point lot X 306, and a basic policy 312 governs the characteristics and behavior of point lot Y 308. The THS 202 can assign policy IDs to each of the policies (310, 312). The basic policies (310, 312) can provide various information, including the following non-limiting set of information:

A first field of information in the basic policies (310, 312) can govern a manner in which the point information specified in the point lots (306, 308) translates or corresponds to actual end-use values. In the case where the points represent monetary amounts, for instance, this first field can identify formulas or rules used to convert the points to monetary amounts (e.g., currency amounts of an identified jurisdiction). This information can be expressed in different ways, such as by providing a currency attribute, a country code attribute, and a per-point value (which identifies the amount of resources associated with each point). The conversion of points into monetary values can be expressed by a conversion ratio or conversion algorithm (if the conversion is non-linear).

The first field can also specify whether the points were created in response to a purchase made by a participant (e.g., a consumer), or a reward/gift (e.g., by a provider to the consumer).

A second field of information in the basic policies (310, 312) can define general constraints that apply to the point lots (306, 308). For example, the second field can define a maximum and/or minimum amount of points that can be stored in the point lots (306, 308). This information can be expressed in different ways, such as by providing a maximum points allowed attribute and a minimum points allowed attribute.

A third field of information in the basic policies (310, 312) can define general usage pattern constraints that apply to the point lots (306, 308). For example, the third field can define a maximum and/or minimum amount of points that can be consumed from the point lots (306, 308) by a consumer in a predetermined period of time. This information can be expressed in different ways, such as by providing a maximum usage per time attribute and a minimum usage per time attribute. This field can also include an attribute which specifies the usage time period that is being used to assess whether the maximum and minimum thresholds have been met.

A fourth field of information in the basic policies (310, 312) can specify whether the points in the point lots (306, 308) are refundable. This information can be expressed in different ways, such as by providing refundable attribute.

A fifth field of information in the basic policies (310, 312) can specify whether the points in the point lots (306, 308) are accruable. Like earning interest in a bank account, points with accruable attribute can earn points with a positive balance. This information can be expressed in different ways, such as by providing an accruable attribute.

A sixth field of information in the basic policies (310, 312) can specify whether the points in the point lots (306, 308) permit a negative balance. If a point lot permits a negative balance, this means that the consumer 302 can make purchases without having sufficient resources in the point lot, thus incurring a debt which must be paid at a later time. If a point lot does not permit a negative balance, this means that the consumer 302 must have pre-paid for any purchase that he or she makes. This information can be expressed in different ways, such as by providing an allow negative balance attribute and a prepaid attribute.

A seventh field of information in the basic policies (310, 312) can specify the lifetime of the points in the point lots (306, 308), and other expiry-related information. Namely, this field of information specifies a timeframe or other conditions which determine whether the points in the point lots (306, 308) remain active or not. Associated information can specify a grace period in which a participant is allowed to take action past an expiration date, and so forth. This information can be expressed in different ways, such as by providing various expiry-related attributes.

It will be appreciated that the above-identified list of fields is exemplary and non-exhaustive. Other environments may omit one or more fields, add additional fields, and so forth.

The basic policies (310, 312) can be overridden by override policies. Namely, basic policy 310 can be overridden by override policy 314, and basic policy 312 can be overridden by override policy 316. As the name suggests, the override policies (312, 314) contain rules which override (or replace) the rules in the basic policies (310, 312). For example, basic policy 310 may apply to all of the consumers associated with a particular provider (e.g., a merchant of goods and services). However, for any reason, an administrator may wish to make an exception for one or more consumers. The THS 202 systems accommodates this need by allowing the administrator to create an override policy 314 that will effectively override one or more fields (or possible all fields) of the basic policy 310. For example, an administrator may wish to appease a consumer who complains about a certain situation by changing the rules for that particular consumer (but not others). Indeed, the administrator can provide overrides that are localized to a particular point lot owned by the consumer. The administrator can also provide an override policy which has more widespread effect, e.g., by providing an override policy that affects every account associated with a particular provider, every account associated with a particular jurisdiction (e.g., country), and so forth. The use of override policies (314, 316) to modify basic policies (310, 312) is advantageous, as it addresses exceptions to the general rule established by the basic policies (310, 312) without modifying the basic policies (310, 312) themselves.

However, an entity associated with the THS 202 (such as a provider or administrator, etc.) may determine that it is inappropriate to override one or more fields in the basic policy (310, 312). Such an entity can therefore prevent another entity from overriding these fields by flagging these fields as non-overridable. This will prevent anyone from writing an override policy (314, 316) that has the effect of overriding these protected fields.

As noted above, sandbox information defines the environments to which the point lots (306, 308) can be applied. Namely, sandbox constraints 318 define the environments to which point lot X 306 can be applied to, and sandbox constraints 320 define the environments in which point lot Y 308 can be applied to. A use environment may correspond to a type of end-use constraint that governs how the consumer 302 can apply the points in the point lots (306, 308). For example, a sandbox constraint may specify that a point lot can be used only for goods and services provided by one particular provider (merchant), a group of providers, a jurisdiction (e.g., country), and so forth.

In the exemplary and non-limiting case of FIG. 3, the sandbox constraints 318 do not specify any sandbox restrictions, meaning that the consumer 302 remains free to consume the points in the point lot X 306 within any exemplary environment, such as the two exemplary environments shown in FIG. 3, namely, environment A 322 and environment B 324. On the other hand, the sandbox constraints 320 restrict the consumer 302's use of the points in point lot Y 308 to environment B 324, meaning that the consumer cannot use the points to make purchases in the context of environment A 322. The sandbox constraints (318, 324) can be specified in different ways, such as by providing an attribute that determines whether the sandboxing feature is active or not. Another attribute can provide a code which determines the environment or environments to which the points in the point lot can be used within. Or the code can identify excluded environments.

Providing that the consumer 302's transaction is allowed to proceed, then the basic policies (310, 312) (as modified by any applicable override policies (314, 316)) govern the characteristics and behavior of such a transaction. For example, assume that the consumer 302 is shopping in an online environment that permits the consumer 302 to use both point lots (306, 308) in the consumer 302's account 304 to make a purchase. More specifically, assume that such an environment is implemented by an online media provider that allows the consumer 302 to purchase movies in an on-demand fashion. Assume that point lot X 306 contains 300 points and point lot Y contains 400 points, making a total of 700 points available to the consumer 302. (Assume further that these points translate to a monetary value of 125 U.S. dollars). However, assume that the consumer 302 wishes to purchase 10 movies from the media provider, having a total cost of 150 U.S. dollars. This sale can only go forward if one or more of the user's point lots (306, 308) permits the consumer 302 to incur a debt (a negative balance) by making a purchase for which the consumer 302 has insufficient funds currently available. This is reflected by an allow negative balance attribute in the basic policies (310, 312) or the override policies (314, 316) (if applicable).

The actual process of determining the amount of points that are available for use in making a purchase, and the subsequent debiting of such points, can be configured in different ways depending on different design considerations. In one case, the THS 202 first identifies point lots that are available to provide funds for the consumer 302 with respect to a particular purchase within a particular use environment. Then the THS 302 computes the total amount of the points available by summing the amount of points available in the different available point lots. Then the THS 302 debits the points from the available point lots to make the purchase.

Different rules can be used to govern this debiting. In a first case, the points can be debited on a first-in-first-out (FIFO) basis, meaning that points are consumed in the order in which they were created (e.g., such that the oldest points are always consumed first). Time-of-creation information can be assessed based on timestamp information associated with the point lots, which determines when the points were added to the point lots. Alternatively, or in addition, the THS 202 can be configured to pull from available point lots using a priority ranking scheme.

Other fields in the policies (310, 312, 314, 316) determine other aspects of the behavior of the THS 202 vis-à-vis the point lots (306, 308).

Presuming that a transaction has successfully taken place, the THS 202 stores the transaction in records associated with the point lots (306, 308). Namely, if the consumer 302 drew points from point lot X 306 to make a purchase, then the THS 202 will log this transaction in a transaction record 326. If the consumer 302 drew points from point lot Y 308 to make a purchase, then the THS 202 will log this transaction in a transaction record 328. These transaction records (326, 328) (also referred to as tables herein) provide useful accounting information. According to one use, this accounting information can be accessed to answer any questions a consumer (or other participant) may have regarding purchase activities (if so authorized to access this information).

In additional to straightforward purchases, the THS 202 is configured to accommodate a number of special transactions and promotional programs. For example, in one scenario, the consumer 302 can transfer points from one point lot to another point lot (where the receiving point lot may be subject to different rules than the originating point lot). For example, the consumer 302 can transfer points from a point lot associated with a first account that he owns to another point lot associated with a second account that he owns.

In another scenario, a consumer (or any other authorized entity) can transfer points to a point lot associated with an entirely different consumer (or other receiving entity). For example, the THS 202 can accommodate the transfer of points from one consumer to another consumer as a gift. Or the THS 202 can accommodate the transfer of points in conjunction with a business transaction performed between two or more parties. Such transfers can be configured as one-time events that occur in response to the express (manual) activity of the distributor (grantor) of points. Or a consumer (or other entity) can set up a policy whereby the THS 202 transfers points to a recipient on a periodic basis without the express intervention of the distributor (grantor). This provision might be useful where, for example, a parent wishes to distribute a monthly allowance to a child, a homeowner wishes to pay monthly bills, and so forth.

In another scenario, the THS 202 can be configured to set up special promotions which transfer points to eligible recipients based on the occurrence of certain events. For example, a provider may offer consumers a certain amount of points if they encourage a friend to take some action which benefits the provider (such as by making a purchase from the provider, or registering with the provider's online service, etc.). This program may be coined as a "Refer a Friend" program, since it grants points when a consumer refers someone to the provider. In another program, a provider may grant consumers points if they take some action with respect to promotional material that is forwarded to the consumers. For example, the provider may send unsolicited advertising material to the consumers, and then offer the consumers free points if they consume such advertising material (e.g., by activating a link to the advertising material or opening an Email attachment, and so forth).

The THS 202 accommodates still other kinds of special transactions and promotional programs. Section C (below) outlines, in greater detail, exemplary scenarios in which the THS 202 can be used.

A.2. More Detailed Explanation of Exemplary System

The transaction handling system (THS) 202 introduced in the preceding subsection can be implemented in many different ways. This subsection, in conjunction with FIG. 4, describes one exemplary implementation of the THS 202.

To begin with, the THS 202 can be coupled to participant entities (212, 214, 216) via a coupling mechanism 402. The coupling mechanism 402 can comprise any mechanism or combination of mechanisms for coupling the participants (212, 214, 216) to the THS 202. For instance, the coupling mechanism 402 can include any kind of network (or combination of networks), such as a wide area network (e.g., the Internet), an intranet, Digital Subscriber Line (DSL) network infrastructure, point-to-point coupling infrastructure, and so on. The coupling mechanism 402 can use or involve any kind of protocol or combination of protocols, such as the Internet Protocol (IP), the Transmission Control Protocol (TCP), the User Datagram Protocol (UDP), the HyperText Transfer Protocol (HTTP), the Simple Object Access Protocol (SOAP), and many potential others. For example, information can be exchanged between the participants (212, 214, 216) and the THS 202 via SOAP messages. SOAP messages comprise a header portion and a body portion, where the body portion expresses information using the extensible markup language (XML).

Figure 8:
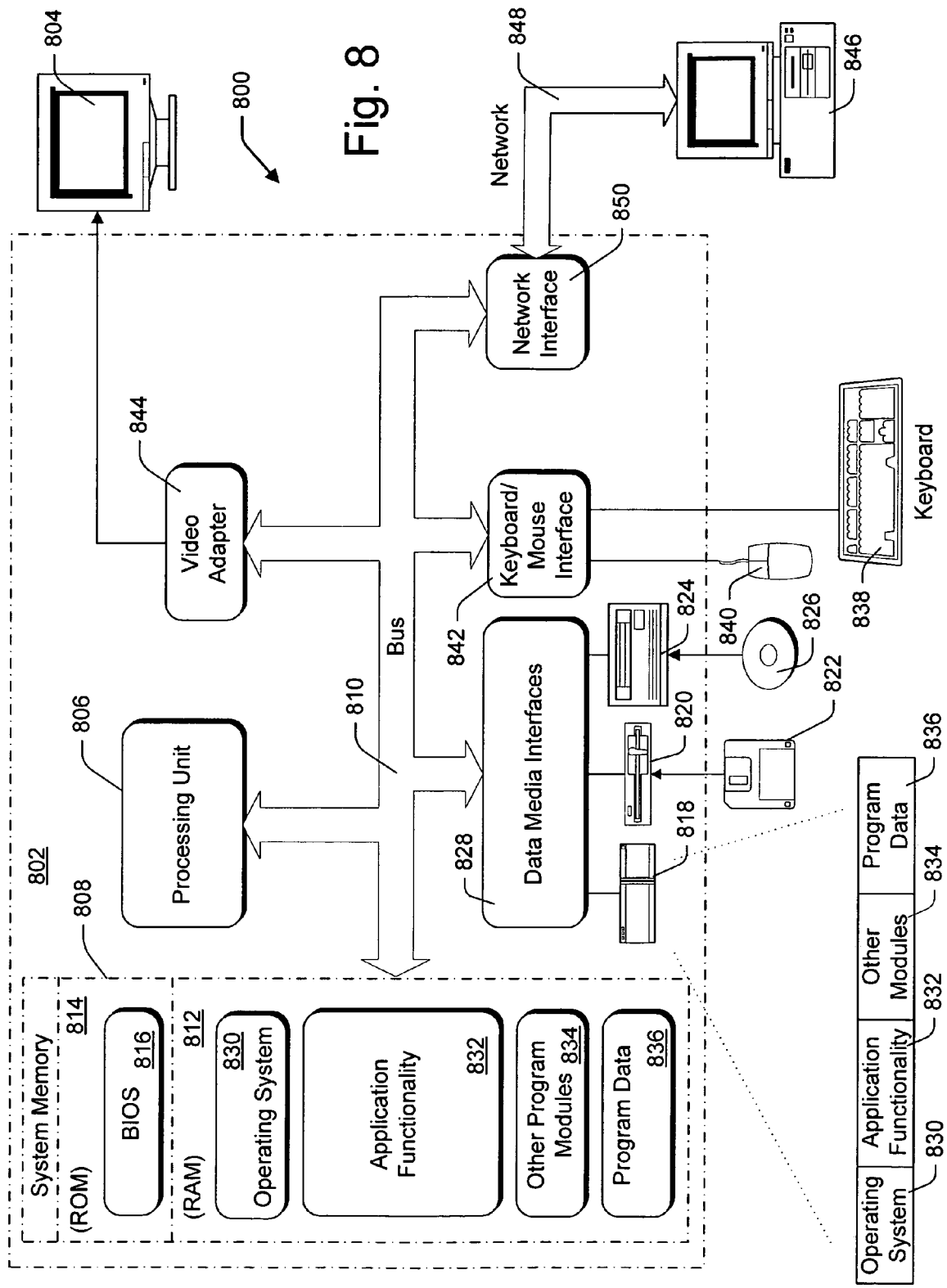
FIG. 8 shows an exemplary computer environment for implementing aspects of the transaction handling system of FIG. 2.

The participants themselves (212, 214, 216) were introduced in the context of FIG. 2. To review, a fist collection of participants include consumers. Consumers consume resources using the THS 202, where such consumption may prompt the debiting of points from the consumers' associated accounts. Consumer device A 212 represents one device operated by a consumer A. The consumer device A 212 can correspond to personal computer device, personal digital assistant (PDA) device, intelligent mobile phone device, any kind of transportable or wearable computer device, any kind of game console device (such as Microsoft Corporation's Xbox™ game consoles), and so forth. In any event, the client device A can include a processing component (not shown) which performs processing tasks, and a presentation component (not shown) which provides is output that enables the consumer A to interact with the consumer device A 212. The presentation component may comprise a visual output unit (e.g., a CRT or LCD type display unit, etc.), an audio output unit, a tactile output unit, etc., or any combination of such output units. FIG. 8 (to be described below) provides an exemplary computer environment that can be used to interact with the THS 202 as the consumer device A 202.

A second collection of participants include partner providers. Providers provide resources for consumption by the consumers using the THS 202. Provider device A 214 represents one device operated by a provider A. The provider device A 214 can correspond to any type of unit described above with respect to the consumer device A 202, or may correspond to a system of such units and other equipment. FIG. 4 generically illustrates that exemplary provider A 214 includes processing functionality 404 that works in conjunction with a local data store 406. The processing functionality 404 and associated data store 406 can be used to provide resources to the consumers, to perform local transaction logging, to perform transaction reconciliation with respect to the THS 202, and so forth.

A third collection of participants include various other miscellaneous participants, of which participant A 216 is one. This participant 216 may correspond to any authorized entity and associated functionality which interacts with the THS 202 for any reason. For example, participant A 216 may correspond to an administrative person (and associated functionality operated by the person) for providing manual or semi-automated assistance to consumers and/or providers as they interact with the THS 202.

As to the THS 202 itself, the processing functionality 204 (introduced in the context of FIG. 2) can be comprised of front end service functionality 408, middle tier functionality 410, and background processing functionality 412. These three tiers (408, 410, 412) can perform different functions in the THS 202. By way of overview, the front end service functionality 408 provides an interface that various participants (212, 214, 216) can use to interact with the THS 202. The middle tier functionality 410 performs processing tasks in support of instructions received via the front end service functionality 408. And the background processing functionality 412 performs so-called back-end processing tasks that are not necessarily in response to real-time transaction events; in other words, the back-end processing tasks occur in a manner which is transparent to the participants (212, 214, 216) which interact with the THS 202.

The front end service functionality 408 can include various functions, including: an administrative (care) function; an account provisioning function; a point transfer function; a high volume consumption function, and so forth. The middle tier functionality 410 can also include various functions, including: an account management processing function; a transaction processing function, and so forth. The background processing functionality 412 can also include various functions, including: a billing processing function; a clean-up management function; a notification processing function; a transaction reconciliation function; an account maintenance function; a fraud management function, and so forth. Later subsections provide more detailed information regarding the tasks performed by each of these functions.

The THS 202 can also include (or can cooperate with) security functionality 414. The security functionality 414 can provide authorization and authentication that allows the participants (212, 214, 216) to interact with the THS 202. The security functionality 414 can apply any kind of security mechanism, such as the encryption and decryption of messages based on certificates, and so forth. In operation, for example, when a function in the front end service functionality 408 receives a request from a participant (212, 214, 216), this function can access the security functionality 214 to perform authorization/authentication. If this security check is successful, the THS 202 can grant access to other functionality provided by the THS 202.

The THS 202 can also interact with other systems (potentially supplied by $3^{rd}$ party entities), as represented by "other functionality" 416. This other functionality 416 can perform a variety of supplemental tasks, such as various account processing tasks based on transaction information fed to it by the THS 202.

In another scenario, the other functionality 416 can represent a commerce framework that works in conjunction with the THS 202, performing certain functions involved in the purchase of goods and services. For example, the other functionality 416 can allow customers to purchase points using a credit card or other purchase mechanisms, leaving management of the thus-created point lots to the THS 202. Or this THS 202 itself can perform such points-purchase functions.

A.3. Exemplary Design of Data Store

Figure 5:
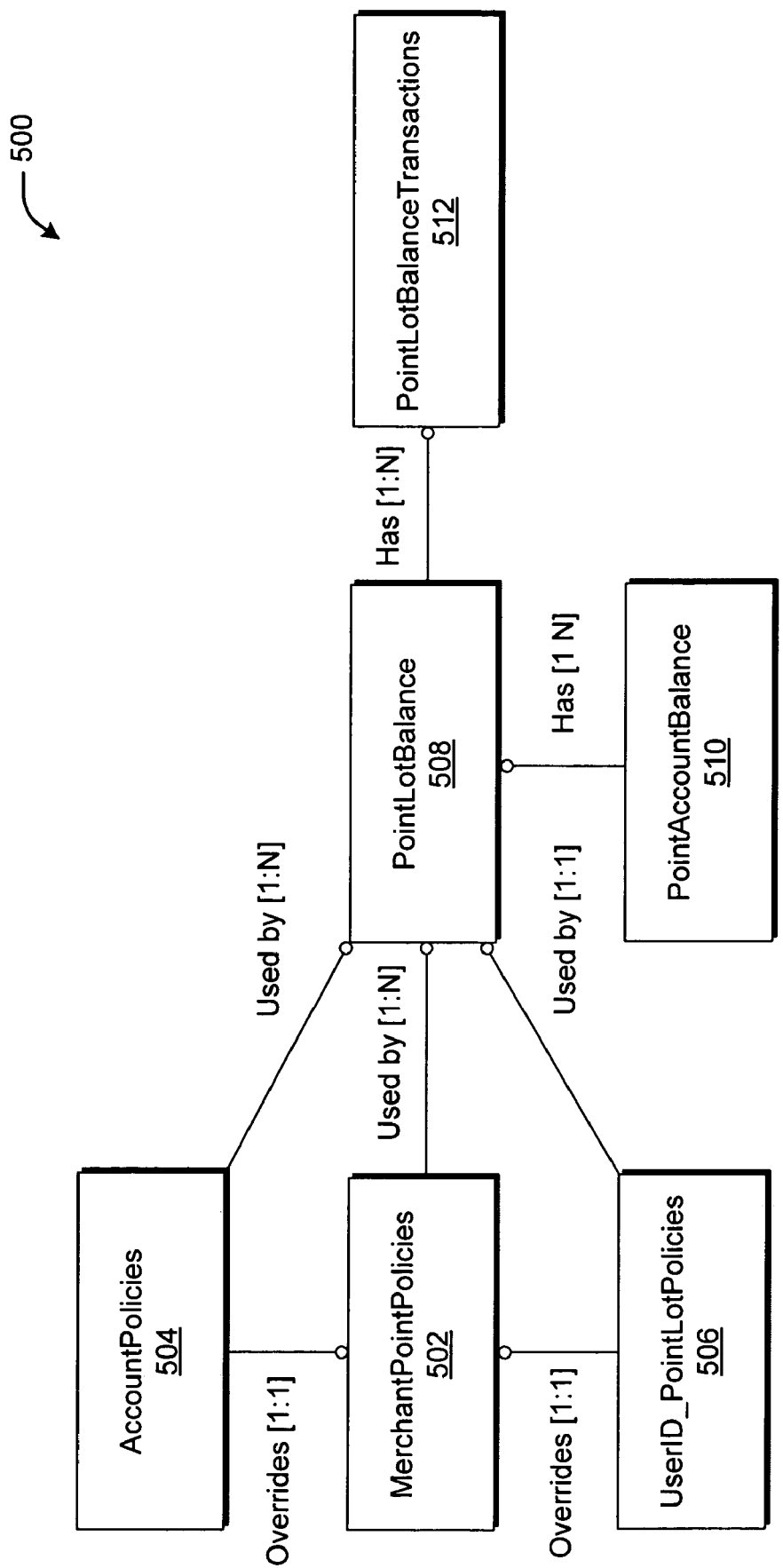
FIG. 5 shows an exemplary interrelation of tables that can be maintained by the transaction handling system of FIG. 2.
Figure 6:
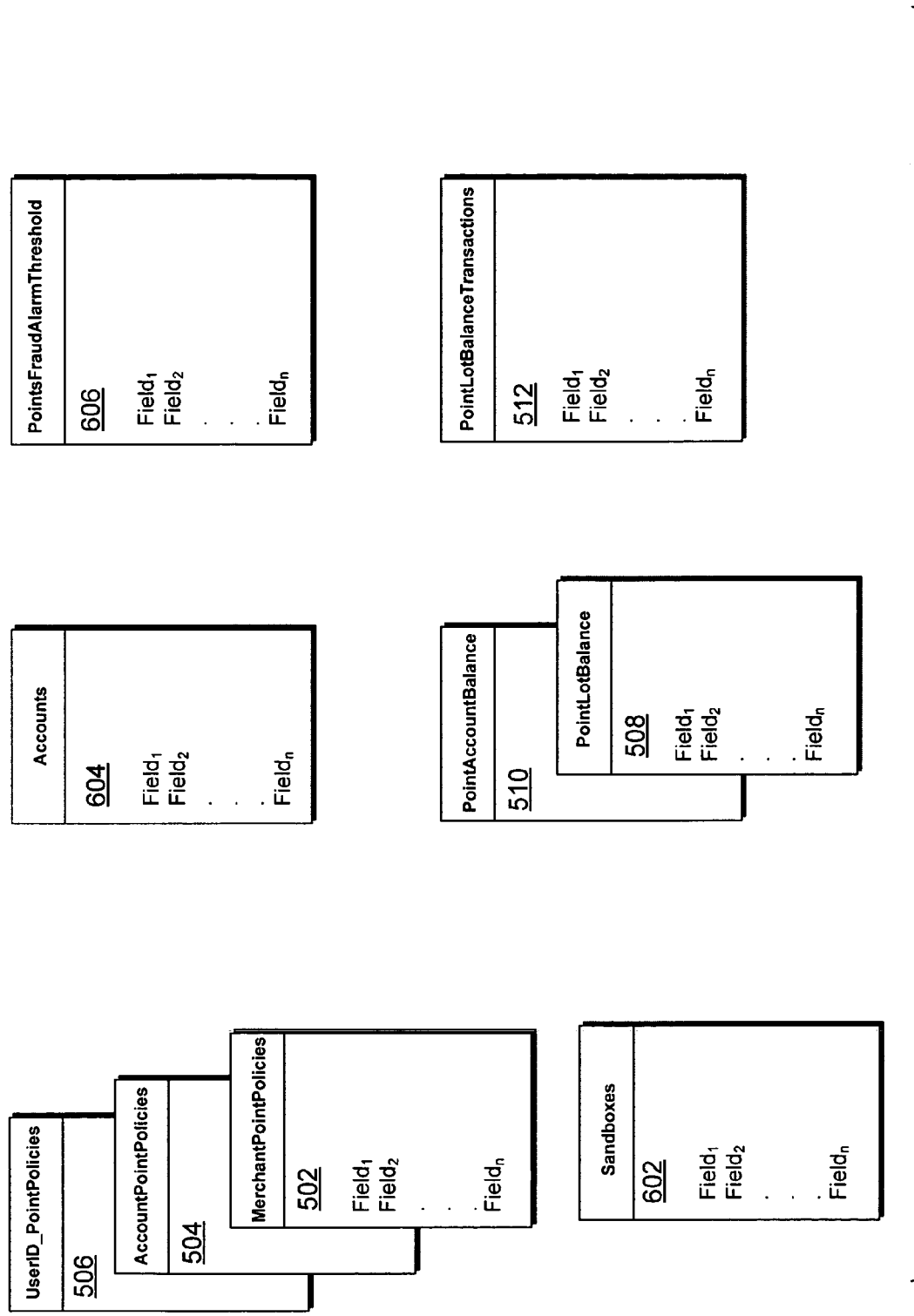
FIG. 6 shows a more detailed depiction of the tables shown in FIG. 5.

FIGS. 5 and 6 provide information regarding the exemplary logical design of the data store 206.

Starting with FIG. 5, this figure tracks the concepts introduced in the scenario of FIG. 3. The objects or entities shown in FIG. 5 correspond to tables maintained by the data store 206. Namely, FIG. 5 shows a MerchantPointPolicies table 502 that corresponds generally to the basic policies (310, 312) shown in FIG. 3. The MerchantPointPolicies table 502 defines policies that govern the characteristics and behavior of associated point lots. The MerchantPointPolicies table 502 can be overridden by an AccountPointPolicies table 504 and UserID_PointLotPolicies table 06. Collectively, the AccountPointPolicies table 504 and the UserID_PointLotPolicies table 506 correspond to the override policies (314, 316) introduced in FIG. 3. Namely, the AccountPointPolicies table 504 specifies account-specific rules that can override the MerchantPointPolicies table 502 with respect to a specified account. The UserID_PointLotPolicies table 506 specifies consumer-specific rules that can override the MerchantPointPolicies table 502 with respect to a specified consumer.

A particular policy is defined by a combination of the MerchantPointPolicies table 502, the AccountPointPolicies table 504, and the UserID_PointLotPolicies table 506. This policy governs the behavior and characteristics of point lots associated with a PointLotBalance table 508. The point lots represented by the PointLotBalance table 508 can be associated with an account. A PointAccountBalance table 510 represents such accounts. Finally, a PointLotBalanceTransaction Table 512 stores transactions associated with the point lots identified in the PointLotBalance table 508.

Additional information regarding the above-identified tables will be set forth as follows. First, as to the MerchantPointPolicies table 502, exemplary fields in this table 502 were identified in the context of Fig. 3 (and are summarized in the upper-left portion of FIG. 3). Some policies can be flagged as deprecated, meaning that they can not be used to create new point lots. The THS 202 maintains these policies on behalf of those previously created point lots that reference the deprecated policies. Entirely unreferenced policies can be flagged for deletion.

An exemplary policy containing human-readable fields defined in the MerchantPointpolicies table 502 is provided below:

| Attribute | Value |
| --- | --- |
| PolicyID | 1 |
| PolicyName | DefaultMerchantPolicy |
| Currency | $ |
| Country | USA |
| MaxPoints | 10,000 |
| MinPoints | 500 |
| Refundable | False |
| Expiration | 1 year |
| MaxConsumptionPerDay | 2000 |
| PointsValue | 1 point = (1/100) penny |

The PointLotBalance table 508 accommodates real-time balance inquiry. More specifically, this table 508 provides the total as well as the remaining balance for each point lot within each account associated with a user ID. This table 508 can also provide the total points issued as well as unclaimed by providers. This table 508 can flag the balance with various states: namely, a PS_Default state identifies that a point lot is operating in a normal state; a PS_Suspended state denotes that a point lot cannot be used until the suspended stated is removed; a PS_Voided state indicates that the points in a point lot have been voided or funded; a PS_PendingDelete state indicates that the points in a point lot have been consumed, refunded, or confiscated; a PS_Expired state indicates that the account associated with a point lot has expired; a PS_PendingDelete state indicates that a point lot is pending deletion (e.g., subsequent to proper refund); a PS_PendingTransfer state indicates that points are pending a transfer that has not gone through yet, and the points to be transferred (i_LockedPoints) should be locked until either the transfer has been completed or cancelled. Status flags can be set by external API calls as well as background processing jobs.

The PointAccountsBalance table 510 can provide summary balance information on a per-provider site basis (e.g., regarding all accounts owned by a particular merchant), on a per-consumer account basis (e.g., regarding all accounts owned by a particular consumer), or on some other basis.

The PointLotBalanceTransaction table 512 records all point transactions (including consumer-to-consumer transactions, merchant-to-consumer transactions, merchant-to-merchant transactions, and so forth). Such transaction may include regular purchase transactions, transfer transactions, reward-conferring transactions, borrowing transactions, refund transactions, redemption transactions, debit transactions, suspension/resumption transactions, voidance transactions, and so forth. This table facilitates real-time reporting of account activities.

FIG. 6 is another illustration of many of the tables shown in FIG. 6, including MerchantPointPolicies table 502, AccountPointpolicies table 504, UserID_PointPolicies table 506, PointLotBalance table 508, PointAccountBalance table 510, and PointLotBalanceTransactions table 512. The above discussion identified the exemplary characteristics of such tables. FIG. 6 supplements FIG. 5 by also illustrating that each of the tables includes a number of fields that set forth various attributes of the tables. For example, to repeat, exemplary fields of the MerchantPointPolicies table 502 are identified in the upper left corner of FIG. 3.

In addition, FIG. 6 identifies a Sandboxes table 602. This table 602 provides information regarding various environment-type use restrictions that can be applied to the point lots. For example, this table 602 can specify different sandbox environments using different codes assigned to the environments.

FIG. 6 also identifies an Accounts table 604. This table 604 identifies information regarding various accounts maintained in the data store 204.

FIG. 6 also identifies a PointsFraudAlarmsThreshold table 606. This table 606 identifies various parameters that govern the detection of potential fraudulent use of the THS 202. For example, this table 606 stores thresholds and other information used to trigger a determination of possible impermissible behavior. These parameters can be used for real-time fraud detection operations, as well as backend (non-real-time) fraud detection operations.

In terms of physical implementation, the data store 204 can be partitioned by user ID. This provides scalability for the potentially high transaction volume of point consumption activity and balance queries. Various data in the above-identified tables can be duplicated in all data store 204 partitions, so that such data is available to stored procedures running on each partition. The THS 204 can add information into the various tables by adding rows into appropriate locations of the tables, such as at the end of the tables. This technique of adding rows to the tables avoids time-consuming data migration operations that might slow the operation of the THS 202. More specifically, it is more efficient to append rows at the end of a table, rather than into the middle of the table. This is because inserting rows into the middle of the table requires existing rows to be shifted forward, but adding rows at the end of the table does not affect the already existing set of rows in the table.

The data store 204 can be implemented in various ways, to provide different levels of redundancy and safety. In these implementations, primary servers can be dedicated to default read and write transactions with no incoming replication traffic. Backup servers can be dedicated to continuous read and write failover, read load balance, and background processing (such as fraud detection, and data consolidation and aggregation, and so forth). Generally, a number of servers that are needed can be computed as $X=E*(1+Sx)/Tx$, where E refers to the expected peak system tps (transaction per second), Sx refers to a safety factor, and Tx refers to an expected tps per server with a defined server configuration. The THS 202 can provide various configurations of primary and backup servers, providing single backup, redundant backup, and so forth.

A.4. Exemplary Front End Service Functionality

As described above, the THS 202 includes various tiers (408, 410, 412) that perform different operations. This subsection provides additional information regarding functions performed by the front end functionality 408, which comprise: an administrative care function; an account provisioning function; a point transfer function; a high volume consumption function, and so forth.

First, the administrative care function provides administrative assistance to different participants (212, 214, 216) which interact with the THS 202. For example, the administrative care function can provide assistance to providers (e.g., merchants). In this context, the administrative care function presents providers with various pages to perform account management. Such account management can include: creating, viewing or modifying global point lot policies; inquiring into a provider account balance; inquiring into a provider transaction history; performing transfer of points to other accounts, and so forth. The administrative care function can also provide assistance to consumers (end users). In this context, this function provides the consumers with various pages to perform account management. Such account management can include: inquiring into a balance; inquiring into a transaction history; performing transfer of points to other accounts (e.g., of other users); specifying usage policy, and so forth. The administrative care function can also provide assistance to customer service representatives by presenting various pages that allow the representative to perform account management on behalf of consumers. Such account management can include: unlocking locked accounts; performing balance adjustment (repudiation); performing reverse cancellation; extending expiration dates; re-sending certain notifications to participants, and so forth.

The account provisioning function provides an interface which allows providers to access an account management component provided in the middle tier functionality 410. Namely, this function can provide interfaces for: creating an account; expiring and deleting of an account; creating an account policy and associated attributes; changing an account policy and associated attributes; deleting an account policy and associated attributes; creating a point lot policy; changing a point lot policy, and so forth.

The point transfer function provides "participant-facing" interface functionality for handling medium transaction volumes. This function has interfaces supporting both single and batch point transfer transactions.

The high volume consumption function provides "participant-facing" interface functionality for handling higher transaction volumes (compared to the above-described point transfer function). This function has interfaces supporting both single and batch point transfer transactions.

The front end service functionality 408 and the participants (212, 214, 216) can interact with each other via application programming interface (API) functionality. Such functionality can comprise a collection of API functions (APIs) that perform different tasks. In the following, a few introductory remarks will precede a discussion of individual APIs.

First, the APIs that perform database write operations can receive an input transaction ID (transactionGuid). The entity that calls the API (on the caller side) generates this transaction ID. This transaction ID has the effect of assuring that the transaction, upon retry if necessary, will not be repeated. Moreover, the called API will generate a transaction output ID (txn_ID) that confirms the success of the API call. The entity that calls the API (e.g., provider) can keep this txn_ID for later reconciliation/auditing with the THS 202. In one implementation, the txn_ID can correspond to the input transactionGUID itself.

Other ID information used in many of the APIs includes policy ID, catalog ID, user ID, and lot ID. As mentioned above, a policy ID comprises unique identification data that identifies a policy, a user ID comprises unique identification data that identifies a user, and a lot ID comprises unique identification data that identifies a point lot. A catalogue ID comprises unique data that identifies a target market (country-region), currency, web-operator (to match with sandbox points), and so forth.

Second a transaction floor limit identifies a minimum value that must be met before a provider will record a transaction in the THS 202. This is to ensure that the cost of performing a transaction does not outweigh the value of the transaction itself. The APIs can be configured to immediately return an error if the submitted transaction value is below the prescribed floor limit. The provider can address this issue by batching small transactions before submitting them to the THS 202 (e.g., in a daily batch reconciliation procedure). The risk of fraud is one consideration that influences the level at which the transaction floor limit is set; namely, in those environments with a higher risk of fraud, it may be desirable to set the threshold limit such that the transactions are reported more frequently (compared to a more secure environment).

Third, the APIs can be configured to require authentication and authorization to provide appropriate security. In one exemplary and non-limiting implementation, security tokens can be configured to comply with web service (WS) security standard formats and can be provided to the APIs through security headers in hypertext transfer protocol (HTTP) messages. A user security token can be present for scenarios that require a consumer's online presence. Further, the APIs can be available via a secure sockets layer (SSL) mechanism.

Exemplary API functions that can be used by the front end service functionality 408 are identified below. The participants (e.g., the providers) can include complementary APIs to communicate with the THS 202.

A CreateNewPolicy API is used by a provider to create a new point policy. This API receives, as input, values for various fields that make up a policy (as described above in subsection A.1). This API outputs a PolicyID which identifies the created policy.

An EditPolicy API is used by a provider to edit an existing policy. This API can receive values for the policy fields that are being changed.

A CreateAccount API is used by a participant (e.g., a consumer) to create a points account.

A DeleteAccount API is used by a participant (e.g., a consumer) to delete his or her account.

A CreateGroupAccount API is used by a participant (e.g., a consumer) to create a group account.

A DeleteGroupAccount API is used by a participant (e.g., a consumer) to delete a group account.

An IssuePoints API is used by a provider to issue points to a point lot. If the provider specifies a lot ID, then the points are added to an existing lot. If no lot ID is specified, then the points are added to a newly created lot. This API accepts as an input the number of points that are to be added, the PolicyID (of the policy that will apply to the point lot that receives the points), and a lot ID (if the points are being added to an existing lot). The API outputs the lot ID) for newly created lots (or the same lot ID) as an input If), if present).

A TransferPoints API is used by a participant (e.g., a consumer) to transfer points between consumers. This API accepts input that identifies the parties to the transfer, the amount of points to be transferred, and so forth. Consumers can be identified based on their user ifs. This API can provide various mechanisms to better ensure that the transfer is secure.

An IssueTransferToken API can be used by a provider to grant points to consumers who read unsolicited material provided by the provider (such as advertisement material). For example, the provider may send consumers an Email with such unsolicited material, coupled with a promise to pay the recipients points if they consume the Email (e.g., by activating an attachment associated with the Email, and so forth). The THS 202 system can provide various security assurances to eliminate parties from using this mechanism to transmit malicious content to the consumers. Such an API accepts input that identifies the recipients (e.g., the Email addresses of the recipients), the number of points to be issued, the lot ID of the point lot where the points will originate from, and so forth.

An AcceptTransfer API is used by a consumer to accept the transfer of points (e.g., by taking a points security token), and thereby complete a points transfer transaction.

A VoidPoints API is used by a provider to nullify issued points. For example, a consumer may have purchased points using his or her credit card and then decides to rescind this transaction. The provider can use the VoidPoints API to affect this rescission.

A ConsumePoints API is used by a provider in response to a consumer's online purchase. This API function can accept user ID, catalogue ID, number of points being consumed, and so forth.

An EditPoints API can be used by a provider to edit policy properties that affect the points. For example, an administrative person may invoke this API to extend an expiration date (associated with the points) in response to a consumer's request.

An UnusedProviderPoints API can be used by a provider to receive a report regarding unused points.

A SuspendProvider API can be used to by a provider to suspend any point activity associated with the provider. Unless specific point lots are identified, this API can have the effect of suspending all point lots issued by this provider.

A ResumeProvider API can be used by a provider to resume permitted point activity associated with suspended point lots.

A SuspendUser API can be used by administrative personnel to suspend a user account, e.g., in response to suspicion of fraud.

A ResumeUser API can be used by administrative personnel to resume permitted activity in a user account that has been suspended.

A CreditPoints API can be used by administrative personnel to credit points back to one of the purchased point lots (where such points where previously debited from that point lot).

A BrowseTransactions API can be used by administrative personnel to browse through all transactions given an identified date range and/or list of Trx_IDs.

Finally, a BrowseBalance API can be used by a participant (e.g., a consumer) to examine balances associated with point lots.

The above-identified APIs are exemplary and non-limiting. Other environments can provide additional APIs, omit one or more APIs identified above, and so forth.

A.5. Exemplary Middle Tier Service Functionality

This subsection provides additional information regarding services performed by the middle tier functionality 410, which comprise: an account management function; and a transaction processing function.

The account management function wraps backend database calls for generic account management database operations, including: creating an account; deleting an account;

creating, modifying, deleting an account level policy or attributes thereof; creating, modifying, or deleting a point lot level policy; expiring points; querying account balance information (read only); querying transaction history (read only); locking (suspending) an account; unlocking (un-suspending) an account; locking (suspending) a point lot; unlocking (un-suspending) a point lot, and so forth.

The transaction processing function wraps backend database calls for generic point consumption and transfer consumptions. A point consumption transaction processing component of this function processes high volume transactions. This component supports single transactions as well as batch transactions. For each single transaction, this component can be configured to incur one database round trip to the proper point balance write partition. To perform this task, this component invokes a stored procedure to: evaluate the policy and available balance; insert a transaction row if the policy evaluation passes; and fail the transaction if the policy evaluation does not pass.

A point transfer transaction processing component of the transaction processing function handles the task of moving points from one account to another. This function can be employed in various circumstances, including: when a consumer transfers points to another consumer (e.g., as a gift); when a provider (e.g., a merchant) transfers points to a consumer; when any entity transfers points to a consumer in connection with a coupon; when an entity transfers points to a consumer in connection with a loyalty program; when an entity transfers points to a consumer in connection with any kind of promotion; when a consumer transfers points to a provider upon a cancellation event or an expiration event or some other event, and so forth.

A.6. Exemplary Backend Service Functionality

This subsection provides additional information regarding services performed by the background processing functionality 412, which comprise: a billing processing function; a clean-up management function; a notification processing function; a transaction reconciliation function; an account maintenance function; a fraud management function, and so forth. These functions perform tasks in the background, that is, independently of the real-time transaction activities invoked by participants (212, 214, 216). The background operations are preferably configured to so not to interfere with such front ends tasks.

As to the first of these functions, the billing processing function performs various billing-related activities associated with logged transactions. This function can forward transaction-related information to other functionality 416. The other functionality 416 can then perform additional bill-related processing associated with the transactions.

The cleanup management processing function performs various database cleanup operations. For example, this function can purge out-dated transaction data on a regular basis and move this data to a backup system.

The notification processing function notifies the consumers upon the occurrence of various events. For example this function notifies the consumers when their points are about to be expired. This function can transmit the notifications via Email, via messages sent via mobile telephone network infrastructure (e.g., via SMS), or via some other channel.

The transaction reconciliation processing function performs transaction reconciliation-related activities. First, this function can be used to alleviate some of the computational load produced by real-time transaction processing. For example, consider the case in which a consumer is allowed to perform a transaction using the post-pay method of billing. In this case, the THS 202 can separate account settlement from the real-time transaction and defer this task to the background processing functionality 416. Second, the reconciliation processing function can perform batch reconciliation on batches submitted by providers. Namely, as described above, providers may be prohibited from sending in small transactions (for instance, in which the point value of the transaction is less than the cost to process the transaction itself). The provider addresses this issue by batching the small transactions and then performing daily batch reconciliation. The provider can communicate batch requests using XML through a secure channel. To support batch transactions, the reconciliation function in the THS 202: splits transactions among write partitions; generates a SQL batch for each write partition; and executes the batch string against each write partition. This function can correctly handle errors so that the failure of one transaction will not affect other transactions in the batch (yet this function will report failed transactions).

The account maintenance processing function performs various accounting-related tasks. For example, this function can clean up expired points. In addition, this function can charge the consumers a fee (e.g., 10 points) for any account that has a balance below a prescribed threshold (e.g., under 1000 points). In addition, this function can perform awards processing, such as by rewarding a consumer 200 points after consuming 1000 points of a provider's service. In addition, this function can expire locked points used in various special programs. These locked points can expire and go back to the program provider's account unless the target recipients redeem the points before expiration.

The fraud management function can perform various operations designed to reduce the occurrence of fraud. Namely, this function can provide two levels of fraud detection. A first level detects fraud occurring in real-time transactions. For example, this function can limit how many points a consumer can purchase or be rewarded. This function can also limit the number of points that a consumer can consume in a given time period (e.g., in a given day). A second level detects fraud that runs across accounts. For example, this function can detect an attacker's improper access into another consumer's account followed by the improper consumption of points. This malicious activity can be detected based on patterns of purchase activity that are unusual for this consumer (as assessed based on transaction records associated with the consumer). Once fraud is detected, this function can block the account from further point transactions until the consumer is contacted.

B. Exemplary Method of Operation (FIG. 8)

B.1. General Principles of Operation

Figure 7:
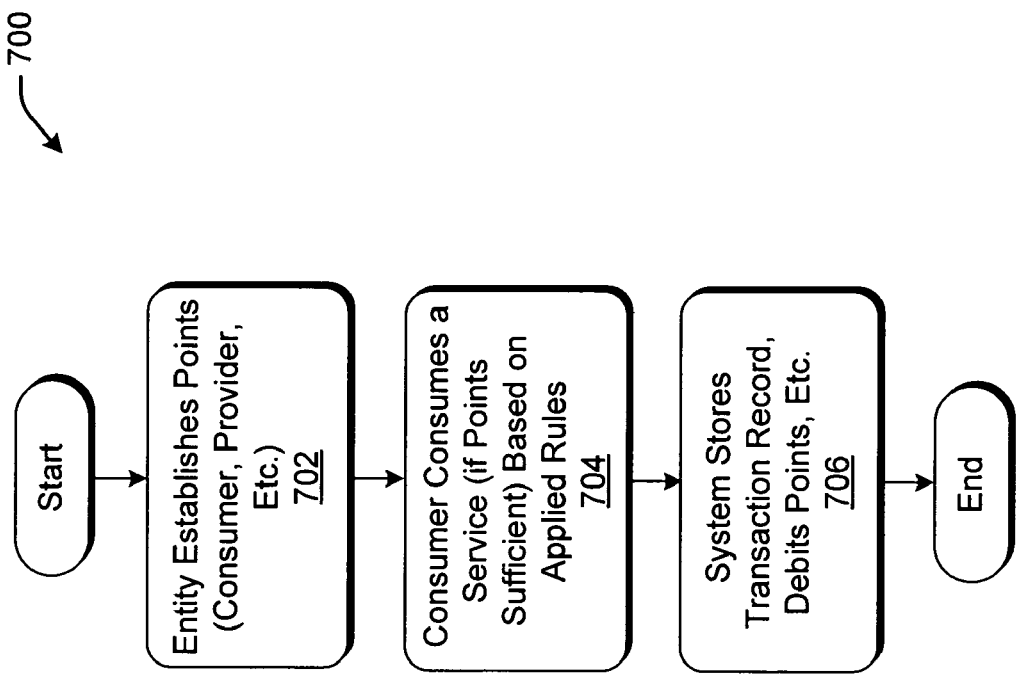
FIG. 7 shows a procedure that explains one manner of operation of the transaction handling system of FIG. 2.

FIG. 7 describes the operation of the transaction handling system (THS) 202 in flow chart form. To facilitate discussion, certain operations are described as constituting distinct steps performed in a certain order. Such implementations are exemplary and non-limiting. Certain steps described herein can be grouped together and performed in a single operation, and certain steps can be performed in an order that differs from the order employed in the examples set forth in this disclosure. As the functions performed by the THS 202 have already been explained in full in prior sections, this section will serve primarily as a review of those functions. The next subsection provides more detailed information regarding exemplary use scenarios.

In step 702 of procedure 700, an entity establishes points in a point lot. The entity may correspond to a consumer, a provider, or some other participant of the THS 202. A rule set is associated with the point lot, as defined by a basic policy and/or an override policy (e.g., either an account override policy or a user override policy). The rule set also specifies sandbox constraints, and so forth.

In step 704, a consumer makes a purchase using the points stored in the established point lot. This purchase is also governed by rules specified in the rule set. For example, if the transaction produces a negative point balance (thus incurring a debt), the THS 202 will only permit this transaction if the rule set states that a pay-later methodology is permitted.

In step 706, the THS 202 debits points stored in one or more point lots owned by the consumer. The THS 202 also records information regarding a successful transaction in a record that is associated with the point lot(s) which have been debited.

B.2. Exemplary Scenarios

The following specific exemplary scenarios will serve to further clarify the operation of the THS 202.

Scenario 1

In a first scenario, assume that a consumer, John, is browsing an online game site and decides to play a game that costs 1000 points.

An exemplary scenario proceeds as follows:

a. The online game site provides a link that allows John to buy points. Upon activating this link, John is connected to purchase functionality (e.g., as implemented as a web service) that permits him to buy points.

b. The purchase functionality determines if John has an account. If John does not have an account, John will be redirected to an account signup page to open an account.

c. John instructs the purchase functionality to charge $10 worth of points to his credit card.

d. The purchase functionality issues 1000 points (in this exemplary case) to John's THS 202 account by calling the IssuePoints( ) API.

e. John's account now has a 1000 generic point balance.

f. John is redirected back to the online game site.

g. John requests to play a game play based on his new point balance.

h. The game site sends a point consumption transaction request to THS 202's point consumption service.

i. The THS 202 performs the transaction by deducting 1000 purchased points. Now John's account has 0 point balance.

j. The transaction succeeds and John is able to play the game.

k. The next day John again goes to the online game site and tries to play another game that costs 400 points.

l. John's attempt is rejected because John's account no longer has sufficient points to play this game.

m. The online game site provides John with a page that invites him to purchase extra points.

n. If John purchases more points, then game play can proceed in the manner described above.

Scenario 2

In this scenario, a consumer, Joe, has been rewarded 600 points by participating in a Refer a Friend program. In addition, Joe has purchased 400 points with his credit card from the purchase functionality. Moreover, Joe is a valued customer and has good credit history, so the THS 202 gives Joe a 1000 point overdraft limit (by specifying this permission in Joe's account level policy, which overrides the basic policy).

An exemplary scenario proceeds as follows:

a. Joe goes to the online game site and decides to play a game which cost 1000 points.

b. The game site sends a point consumption transaction request to the THS 202's point consumption service.

c. The game site performs the transaction by deducting 400 purchased points and overdraft 600 points. Now Joe's account has a total of 600 points in the Refer a Friend point lot and −600 generic points.

d. The transaction succeeds and Joe is able to play the game.

e. The next day Joe wants to play a game that costs 500 points, and accordingly, the game site sends a request to THS 202.

f. The THS 202 rejects the request because Joes has only 400 point left for overdraft.

g. Joe cannot play the game so he goes to another site and decides to download a number of songs that cost 1000 points.

h. This new site sends the request to THS 202's point consumption service.

i. The THS 202 determines that Joe can use 600 points from the Refer a Friend program point lot, and an overdraft 400 points.

j. The transaction succeeds and Joe is able to download the songs.

k. Joe's account now has a −1000 point balance.

l. At this point, Joe cannot consume any points until he refills the account.

m. At the end of the billing cycle, the THS 202 background process generates a billing event (or provides a billing event to a $3^{rd}$ party billing service), stating that Joe owes 1000 points.

n. The THS 202 (or associated billing service) converts the point balance to is currency values and bills Joe.

o. After receiving the payment, the THS 202 calls the point transfer service to issue a new 1000 points, giving Joe's account a zero balance.

In the above decision, note that point consumption transactions and refill request can be submitted to the THS 202 in batch.

Scenario 3

In this scenario, assume that a provider decides to sponsor a Refer a Friend program. The program will award 100 points to each existing subscriber for each customer he/she refers. The points can be used on any site sponsored by the provider. This program will grant up to 10 million points for use in administering the program. The program is identified as ending on Apr. 1, 2005, but the consumer who receives the points is permitted to use them until Oct. 1, 2006.

An exemplary scenario proceeds as follows:

a. The provider creates a MerchantPointLotPolicy by calling the CreateNewPolicy( ) API. As input, the provider specifies: SandBoxID=provider site id (which identifies the environment in which the consumer can use the points); ExpireDate=Oct. 1, 2006 (which identifies the expiration date of the points); and Maximum usage=800 (which identifies the maximum number of points that a consumer can earn), among other possible information.

b. Joe refers Jin, earning Joe points through the Refer a Friend program. These points are added to Joe's existing account (or to a newly created account if a previous account does not exist).

c. Namely, the THS 202 creates a point lot having a policy ID associated therewith. The policy ID identifies the point lot as originating from the Refer a Friend program. The THS 202 also inserts a row in the PointLotBalance table. The new point lot has a 100 point balance.

Scenario 4

In this scenario, Joe tries to download a song that costs 150 point and the transaction is rejected. He has doubt about this rejection because he remembers that he earned 200 points by participating in the Refer a Friend promotion. He goes to the customer self care site to investigate this matter.

An exemplary scenario proceeds as follows:

a. The self care site, using Joe's user ID, sends a request to THS 202 for an account balance summary.

b. The self care site shows Joe a page with the balance summary, and a "Transaction history" link on the page.

c. Joe clicks the "Transaction history" link, and, in response, THS 202's self care site sends a request to view Joe's transaction history, and receives a response that lists all transactions.

d. Joe goes through all of the transactions and finds that there is an "Expiration transaction" which expired his 200 reward points.

e. Joe then calls administrative personnel associated with the to THS 202 to ask about the expiration transaction.

Scenario 5

In this scenario, assume that an administrative help person (assistant) receives Joe's phone call and is prepared to address his questions regarding the expired transaction.

An exemplary scenario proceeds as follows:

a. The assistant accesses an "Access account" page to examine Joe's transaction history.

b. The assistant finds the "Expiration transaction" and clicks on a "View Policy" function.

c. The assistant reviews a "Policy view" page that identifies policy information that applies to the point lot. This policy information identifies that the point lot in question was expired on Oct. 1, 2003, which was two days ago d. The assistant explains the problem to Joe. Joe asks if he can get the points back.

e. The assistant decides to extend the expiration date to the end of October.

f. The assistant reverses the "Expiration transaction" by creating an override policy for this particular point lot.

g. The assistant informs Joe that he can now use the points. Joe does so.

Scenario 6

In this scenario, a consumer has purchased points and then seeks to cash out. In other words, for example, the consumer may have paid for points using a credit card and now seeks to revoke that transaction.

An exemplary scenario proceeds as follows:

a. In response to a revocation request, the THS 202 can call the BrowserBalance and BrowseTransaction APIs to show balance and transaction information to the consumer.

b. The THS 202 can then call the suspenduser( ) API to block further activity associated with the points being revoked.

c. The THS 202 calls the VoidPoints( ) API to cancel all the remaining points and pays the consumer. The APIs can include business rules which prevent cashing out reward points, and so forth.

Scenario 7

In this scenario, a provider wishes to distribute Email to consumers and pay the consumers for reading these Emails.

An exemplary scenario proceeds as follows:

a. The provider can issue a large pool of points by calling the IssuePoints( ) API to itself.

b. The provider can then call the "IssueTransferToken" API to get a secure point token to be embedded into the Email.

c. The consumer, upon reading the email, can send the token to the THS 202 to redeem the points using the AcceptTransfer( ) API. The points are transferred into the consumer's account.

Scenario 8

In this scenario, a provider wishes to conduct a Refer a Friend program as described previously (where a consumer receive points for referring a friend to the provider's service). Assume, for example, that the provider has 1000 valued customers, and wants to reserve 1 million points for these customers (and not other customers). The provider can send these customers invitations, along with a link that the customers may click to claim the points (that is, after the consumers refer a friend). The 1 million special points will be made available to everyone after Feb. 1, 2004 (not just the special group).

An exemplary scenario proceeds as follows:

a. The provider creates an override policy with expiration date set to Feb. 1, 2004, and SandBoxID set to the "id of special reserved."

b. The provider performs a point transfer to a Refer a Friend account (having the Refer a Friend policy associated therewith). This will have the effect of deducting 1 million points from a generic balance and inserting a point lot having 1 million points (which is subject to the override policy).

c. When a normal (non-special) consumer claims points, a debit transaction will deduct the points from the generic balance.

d. When a special consumer claims points, a debit transaction will deduct the points from the special point lot.

e. When the termination date of Feb. 1, 2004 arrives, the account maintenance process is invoked, which expires the special point lot, and places the remaining balance back into the generic pool.

Scenario 9

In this scenario, the THS 202 is used to make monthly point distributions. For example, this feature might be useful in making monthly allowances (e.g., from a parent's account to a child's account). This feature might also be useful in implementing periodic prepaid subscriptions. In these scenarios, the THS 202 may not require the granting entity to explicitly invoke a call to perform the transactions; rather, these transactions can be automatically performed by the THS 202 background processing after a policy is set up that specifies periodic distribution. Namely, a special recurrent distribution policy can be set up on the account level (applicable to the credited accounts). New attributes can be added which specifically address the recurrent distribution program: RecurringCreditAmount; RecurringCredeitDebitor; RecurringCreditDat; and RecurringFrequecy (where the meaning of these attributes is explained by the descriptive names assigned to these attributes).

An exemplary scenario proceeds as follows:

a. David's father decides that David should receive 1000 points every month.

b. The father goes to a customer self care site and clicks "setup monthly allowance for your kid."

c. The father enters David's account name, and the monthly amount to be distributed to David (1000 points), and then submits these instructions.

d. The THS 202 receives the request and updates David's account policy with: i) RecurringCreditAmount=1000; ii) RecurringCredeitDebitor=David's dad's account; iii) RecurringCreditDate=1st day of each month; and iv) RecurringFrequency=monthly.

In the above scenario, the background process on the THS 202 crawls all user accounts. When it sees David's account has RecurringCredit attributes, it performs the point transfer transaction from the father's account to David's account.

C. Exemplary Computer Environment (FIG. 8)

In one exemplary implementation, certain aspects of the system shown in FIG. 4 can be implemented as computer code executed by one or more computer devices. For example, any of the participants (212, 214, 216) can use computer devices to interact with the THS 202. Further, the THS 202 itself can be implemented by one or more server computer devices. In these cases, FIG. 8 provides information regarding an exemplary computer environment 800 that can be used to implement any such computer-based implementations of the system shown in FIG. 4.

The computing environment 800 includes a general purpose or sever type computer 802 and a display device 804. However, the computing environment 800 can include other kinds of computing equipment. For example, although not shown, the computer environment 800 can include handheld or laptop devices, set top boxes, game consoles, mainframe computers, etc. Further, FIG. 8 shows elements of the computer environment 800 grouped together to facilitate discussion. However, the computing environment 800 can employ a distributed processing configuration. In a distributed computing environment, computing resources can be physically dispersed throughout the environment.

Exemplary computer 802 includes one or more processors or processing units 806, a system memory 808, and a bus 810. The bus 810 connects various system components together. For instance, the bus 810 connects the processor 806 to the system memory 808. The bus 810 can be implemented using any kind of bus structure or combination of bus structures, including a memory bus or memory controller, a peripheral bus, an accelerated graphics port, and a processor or local bus using any of a variety of bus architectures.

Computer 802 can also include a variety of computer readable media, including a variety of types of volatile and non-volatile media, each of which can be removable or non-removable. For example, system memory 808 includes computer readable media in the form of volatile memory, such as random access memory (RAM) 812, and non-volatile memory, such as read only memory (ROM) 814. ROM 814 includes an input/output system (BIOS) 816 that contains the basic routines that help to transfer information between elements within computer 802, such as during start-up. RAM 812 typically contains data and/or program modules in a form that can be quickly accessed by processing unit 806.

Other kinds of computer storage media include a hard disk drive 818 for reading from and writing to a non-removable, non-volatile magnetic media, a magnetic disk drive 820 for reading from and writing to a removable, non-volatile magnetic disk 822 (e.g., a "floppy disk"), and an optical disk drive 824 for reading from and/or writing to a removable, non-volatile optical disk 826 such as a CD-ROM, DVD-ROM, or other optical media. The hard disk drive 818, magnetic disk drive 820, and optical disk drive 824 are each connected to the system bus 810 by one or more data media interfaces 828. Alternatively, the hard disk drive 818, magnetic disk drive 820, and optical disk drive 824 can be connected to the system bus 810 by a SCSI interface (not shown), or other coupling mechanism. Although not shown, the computer 802 can include other types of computer readable media, such as magnetic cassettes or other magnetic storage devices, flash memory cards, CD-ROM, digital versatile disks (DVD) or other optical storage, electrically erasable programmable read-only memory (EEPROM), etc.

Generally, the above-identified computer readable media provide non-volatile storage of computer readable instructions, data structures, program modules, and other data for use by computer 802. For instance, the readable media can store the operating system 830, application-specific functionality 832 (including functionality for implementing aspects of the point processing provisions shown in FIG. 4), other program modules 834, and program data 836.

The computer environment 800 can include a variety of input devices. For instance, the computer environment 800 includes the keyboard 838 and a pointing device 840 (e.g., a "mouse") for entering commands and information into computer 802. The computer environment 800 can include other input devices (not illustrated), such as a microphone, joystick, game pad, satellite dish, serial port, scanner, card reading devices, digital or video camera, etc. Input/output interfaces 842 couple the input devices to the processing unit 806. More generally, input devices can be coupled to the computer 802 through any kind of interface and bus structures, such as a parallel port, serial port, game port, universal serial bus (USB) port, etc.

The computer environment 800 also includes the display device 804. A video adapter 844 couples the display device 804 to the bus 810. In addition to the display device 804, the computer environment 800 can include other output peripheral devices, such as speakers (not shown), a printer (not shown), etc.

Computer 802 operates in a networked environment using logical connections to one or more remote computers, such as a remote % computing device 846. The remote computing device 846 can comprise any kind of computer equipment, including a general purpose personal computer, portable computer, a server, etc. Remote computing device 846 can include all of the features discussed above with respect to computer 802, or some subset thereof.

Any type of network 848 can be used to couple the computer 802 with remote computing device 846, such as the WAN 402 of FIG. 4, a LAN, etc. The computer 802 couples to the network 848 via network interface 850 (e.g., the interface 416 shown in FIG. 4), which can utilize broadband connectivity, modem connectivity, DSL connectivity, or other connection strategy. Although not illustrated, the computing environment 800 can provide wireless communication functionality for connecting computer 802 with remote computing device 846 (e.g., via modulated radio signals, modulated infrared signals, etc.).

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method for handling transactions, comprising:
   establishing first and second rule sets that each specify at least one aspect of a transaction handling methodology;
   establishing first and second point lots, each comprising at least one point;
   associating the first rule set with the first point lot and the second rule set with the second point lot;
   handling a transaction involving the first point lot in a manner specified by the first rule set: and
   handling a transaction involving the second point lot in a manner specified by the second rule set.

2. The method of claim 1, wherein the first rule set specifies information regarding how a point in a point lot translates into an end-use-specific value.

3. The method of claim 2, wherein said end-use-specific value defines a monetary amount associated with the point in an identified jurisdiction.

4. The method of claim 1, wherein the first rule set specifies at least one of: a maximum amount of points allowed in a point lot; or a minimum amount of points allowed in a point lot.

5. The method of claim 1, wherein the first rule set specifies at least one of: a maximum amount of points that can be consumed within an identified time frame; or a minimum amount of points that can be consumed within an identified time frame.

6. The method of claim 1, wherein the first rule set specifies sandbox information regarding whether points can be consumed in a specific identified use-environment, or whether the points can be consumed in any use-environment.

7. The method of claim 1, wherein the first rule set specifies information regarding at least one of: a manner in which points are credited in response to transaction events; or a manner in which points are debited in response to transaction events.

8. The method of claim 7, wherein the first rule set specifies that a consumer can not incur debt by performing a transaction that will produce a negative points balance.

9. The method of claim 7, wherein the first rule set specifies that a consumer can incur debt by performing a transaction that will produce a negative points balance.

10. The method of claim 1, wherein the first rule set specifies information that defines an expiration of points.

11. The method of claim 1, further comprising establishing an override rule set which overrides rules in the first rule set.

12. The method of claim 11, wherein said override rule set defines rules which apply to one or more of: an account; or a consumer.

13. The method of claim 1, further comprising recording the transaction involving the first point lot in a transaction record associated with the first point lot.

14. One or more machine-readable media containing machine readable instructions for implementing the method of claim 1.

15. A transaction handling system including logic configured to implement the method of claim 1.

16. A method for handling transactions, comprising:
receiving a point-purchase from a consumer having a prescribed monetary amount associated therewith;
retrieving a rule set that governs the handling of the consumer's transactions;
converting the prescribed monetary amount to a number of points to provide a point lot, and associating the point lot with the rule set;
receiving a transaction request from the consumer that involves debiting or crediting the point lot;
performing the consumer's transaction request on the basis of rules identified in the rule set; and
recording the consumer's transaction request in a transaction record that is associated with the point lot.

17. The method of claim 16, wherein the rule set provides a rule that specifies whether or not the consumer can incur debt by performing a transaction that will produce a negative points balance.

18. One or more machine-readable media containing machine readable instructions for implementing the method of claim 16.

19. A transaction handling system for handling transactions, comprising:
a data store for storing:
a customer account having first and second point lots; and
first and second rule sets that define respective transaction handling methodologies that can be applied to the first and second point lots; and
a processing mechanism configured to:
interact with participants of the transaction handling system and receive input from the participants; and
perform points-related processing based on input received from the participants, wherein the points-related processing performs operations on the first and second point lots stored in the data store based on the respective first and second rule sets that apply thereto.

20. One or more machine-readable media containing machine readable instructions for implementing the transaction handling system of claim 19.

* * * * *